(12) United States Patent
Bailey

(10) Patent No.: US 11,785,115 B2
(45) Date of Patent: Oct. 10, 2023

(54) REQUEST TRACING

(71) Applicant: INTERNATIONAL BUSINESS MACHINES CORPORATION, Armonk, NY (US)

(72) Inventor: Christopher Neil Bailey, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,923

(22) Filed: Sep. 27, 2021

(65) Prior Publication Data
US 2023/0101915 A1    Mar. 30, 2023

(51) Int. Cl.
| | |
|---|---|
| *G06F 21/62* | (2013.01) |
| *H04L 67/60* | (2022.01) |
| *H04L 67/10* | (2022.01) |
| *H04L 43/0811* | (2022.01) |

(52) U.S. Cl.
CPC .......... *H04L 67/60* (2022.05); *H04L 43/0811* (2013.01); *H04L 67/10* (2013.01)

(58) Field of Classification Search
None
See application file for complete search history.

(56) References Cited

U.S. PATENT DOCUMENTS

| | | |
|---|---|---|
| 10,397,343 B1 | 8/2019 | Goldberg |
| 10,880,191 B1 | 12/2020 | Kant |
| 2015/0143343 A1 | 5/2015 | Weiss |
| 2016/0105347 A1* | 4/2016 | Rochette ............... H04L 43/065 709/224 |
| 2020/0328952 A1 | 10/2020 | Makwarth |
| 2020/0372007 A1* | 11/2020 | Ross ....................... H04L 43/18 |
| 2022/0172067 A1* | 6/2022 | Kang ..................... G06N 3/088 |
| 2022/0277042 A1* | 9/2022 | Bianchi ............... G06F 11/3006 |
| 2022/0417219 A1* | 12/2022 | Sheriff .................... H04L 67/56 |

OTHER PUBLICATIONS

Lin et al., "Tracing Function Dependencies Across Clouds", https://par.nsf.gov/biblio/10091225, National Science Foundation, IEEE International Conference on Cloud Computing (Cloud), Jul. 1, 2018, pp. 1-10.

Mell et al., "The NIST Definition of Cloud Computing", National Institute of Standards and Technology, Special Publication 800-145, Sep. 2011, pp. 1-7.

* cited by examiner

*Primary Examiner* — June Sison
(74) *Attorney, Agent, or Firm* — Tihon Poltavets

(57) ABSTRACT

Embodiments of the present invention provide concepts for tracing a request in a distributed system architecture comprising one or more distributed services. A request is received at a network traffic component on one of a plurality of sockets, which are monitored by a span correlation component. Span data is obtained from the received request and a process identification component is adapted to identify a process associated with the request based on the span data. The span correlation component is adapted to identify a socket connection made by the identified process and correlate the socket connection with the span data, thereby generating span correlation data.

20 Claims, 7 Drawing Sheets

REQUEST TRACING

BACKGROUND

The technical character of the present invention generally relates to the field of systems having a distributed system architecture, and more particularly, systems and methods for tracing a request in systems having a distributed system architecture.

The concept of distributed tracing has existed for a number of years to provide the ability to trace a request across one or more distributed services, providing information about the service APIs called, their latency and their response codes. The evolution of distributed system architectures, first towards service orientated architectures and more recently towards microservices, the function of a distributed system has been decomposed into smaller and smaller units of functionality across multiple distributed services.

Accordingly, making the use of distributed tracing capabilities of the system is increasingly important to observe and monitor the distributed services. Whilst distributed tracing is a necessary component of observing distributed applications, it is often not sufficient. The basic tracing data needs to be supplemented with additional data, such as metrics and logs from the services, and the particular instance of services that running with multiple replicas, in order to gain insight into the overall system and to be able to answer questions such as why a particular service call was slow or returned an error when it had not previously.

Correlating distributed tracing data to service metric and log data is often problematic due to the mechanism that is used to describe and collect the distributed tracing data. Distributed tracing data is collected using units of work performed by the distributed system referred to as spans. Spans represent named and timed operations performed by a service of the distributed system, sent to a remote collector, typically over a HTTP or UDP connection.

This approach relies on self-declaring a component or service name by the services of the distributed system and is problematic for in a number of ways. For example, for services that have multiple instances, it is not possible to identify the specific instance of the service that a given span refers to. In a further example, it is possible for naming collisions to occur where spans are being received from two different services using the same component or service name and there is no mechanism to accurately determine if the spans come from the same service, or the same version of a service.

In both of the examples described above, it is not possible to accurately utilize the distributed tracing data to determine a link between, by way of example, an anomaly in the performance of a service seen in a span and a process event such as a restart.

SUMMARY

The present invention seeks to provide a method of tracing a request in a distributed system architecture comprising one or more distributed services. Such methods may be computer-implemented. That is, such methods may be implemented in a computer infrastructure having computer executable code tangibly embodied on a computer readable storage medium having programming instructions configured to perform a proposed method. The present invention further seeks to provide a computer program product including computer program code for implementing the proposed concepts when executed on a processor. The present invention yet further seeks to provide a system for tracing a request in a distributed system architecture comprising one or more distributed services.

According to an aspect of the present invention there is provided a system for tracing a request in a distributed system architecture comprising one or more distributed services. The system comprises a network traffic component adapted to receive the request from a process of a distributed service on one of a plurality of sockets. The network traffic component is adapted to obtain span data from the received request. The system further comprises a process identification component in communication with the network traffic component. The process identification component is adapted to identify a process associated with the request based on the span data. The system further comprises a span correlation component adapted to monitor the plurality of sockets of the network traffic component, identify a socket connection made by the identified process of the distributed service to send the request and correlate the socket connection with the span data thereby generating span correlation data.

Embodiments may be employed in combination with conventional/existing distributed system architectures. In this way, embodiments may integrate into legacy systems so as to improve and/or extend their functionality and capabilities. An improved distributed system may therefore be provided by proposed embodiments.

According to an aspect of the present invention there is provided a method for tracing a request in a distributed system architecture comprising one or more distributed services. The method comprises receiving the request from a process of a distributed service at a network traffic component on one of a plurality of sockets of the network traffic component and obtaining span data from the received request. A process associated with the request is identified based on the span data by way of a process identification component in communication with the network traffic component. The plurality of sockets of the network traffic component are monitored by way of a span correlation component to identify a socket connection made by the identified process of the distributed service to send the request and the socket connection is correlated with the span data thereby generating span correlation data.

According to another embodiment of the present invention, there is provided a computer program product c, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

Thus, there may be proposed concepts for accurately tracing a request in a distributed system architecture comprising one or more distributed services. By monitoring the socket connections of the network traffic component, it is possible to correlate incoming and outgoing connections with spans received from the distributed services. For instance, embodiments may provide for a means of accurately tracing a request in a distributed system architecture. Providing such a request tracing system may help to differentiate between multiple processes originating from the same service and identify which specific process is providing the spans.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
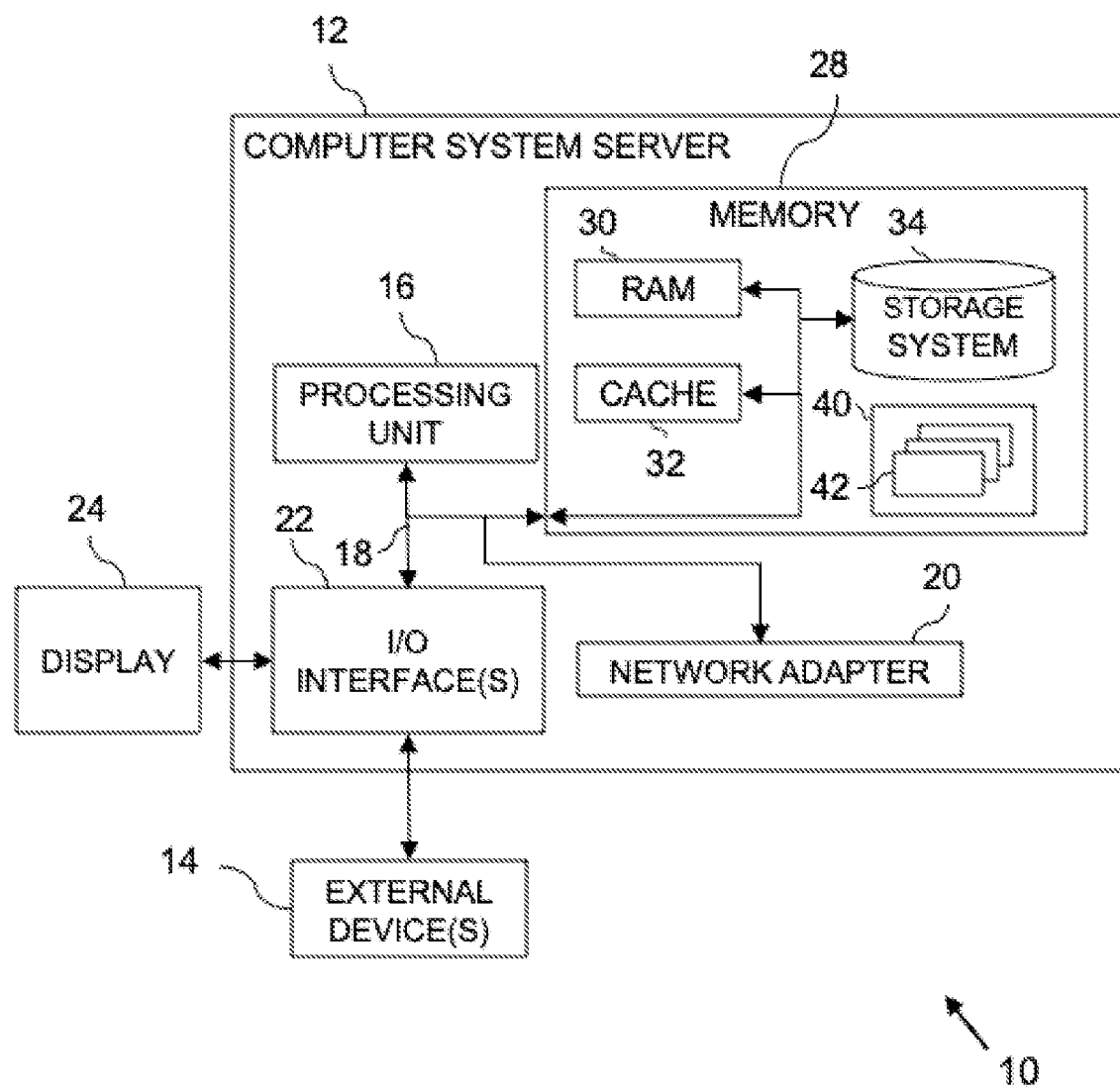
FIG. 1 depicts a cloud computing node according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

The technical character of the present invention generally relates to tracing a request in a distributed system architecture. In particular, the technical character of the invention relates to a system for tracing a request in a distributed system architecture comprising one or more distributed services. The system includes a network traffic component adapted to receive the request from a process of a distributed service on one of a plurality of sockets belonging to the network traffic component. The sockets of the network traffic component are the points at which processes of the one or more distributed services make outbound connections. The network traffic component is adapted to obtain span data from the received request. The system further includes a process identification component in communication with the network traffic component, which is adapted to identify a process associated with the request based on the span data. In addition, the system comprises a span correlation component adapted to: monitor the plurality of sockets of the network traffic component; identify a socket connection made by the identified process of the distributed service to send the request; and correlate the socket connection with the span data thereby generating span correlation data.

The invention may provide a means of accurately tracing a request in a distributed system architecture. Conventional means of performing distributed tracing are often not sufficient for accurately tracing a request in a distributed system. Typically, distributed tracing is performed on the basis of data collected from spans, i.e. a unit of work performed by the distributed system. However, for services that have multiple instances, it is not possible for the specific instance of the service referred to by the span to be identified based on the data collected form the span as the spans typically only identify the service name, which will be the same for all instances of the service. Further, naming collisions may occur where spans are received from multiple sources using the same service name. In both cases, it is not possible to accurately trace a given request through the distributed system.

By monitoring the socket connections of the network traffic component, it is possible to correlate incoming connections with spans received from the distributed services. The correlation data provides an accurate set of data that can be used to identify which specific process is providing the spans and therefore the specific instance of a service providing the spans.

In an embodiment, the process identification component may be further adapted to identify one or more of a monitoring requirement of the process and the distributed service associated with the process. In this way, additional information may be taken into account when tracing the request in the distributed system.

According to an embodiment, the system may further comprise a span annotation component adapted to annotate the span data with the correlation data and forward the annotated span data to the distributed tracing system. By annotating the span data with the correlation data, when the request is sent on from the network traffic component, the request may be consistently tracked throughout the entirety of the distributed system.

In an embodiment, the span annotation component may be further adapted to annotate the span data with a process tag based on the identified process. In this way, additional information may be annotated to the span data, thereby improving the accuracy of the tracing of the request in the distributed system.

In a further embodiment, the process identification component may be further adapted to identify a monitoring requirement of the process, and wherein the span annotation component is further adapted to annotate the span data with the monitoring requirement of the process. In this way, additional information may be annotated to the span data, thereby improving the accuracy of the tracing of the request in the distributed system.

In an embodiment, the process identification component may be further adapted to identify the distributed service associated with the process, and wherein the span annotation component is further adapted to annotate the span data with the distributed service associated with the process. In this way, additional information may be annotated to the span data, thereby improving the accuracy of the tracing of the request in the distributed system.

According to an embodiment, the network traffic component may comprise a host agent or a sidecar proxy agent.

In an embodiment, the span data may include one or more of: a process name associated with the process; a start timestamp and a finish timestamp associated with the process; a tag associated with the process; a log associated with the process; a command line associated with the process; and a loaded library associated with the process.

In an embodiment, monitoring the plurality of sockets of the network traffic component may comprise obtaining a snapshot of a current set of socket connections on the plurality of sockets.

According to an embodiment, monitoring the plurality of sockets of the network traffic component may comprise obtaining event based data from the plurality of sockets. In this way, the span correlation component may more reliably monitor plurality of sockets of the network traffic component as it receives data on all of the events occurring on the sockets, meaning that a connection to the network traffic component by a process will not be missed by the span correlation component.

The technical character of the invention further relates to a method tracing a request in a distributed system architecture comprising one or more distributed services. The method includes receiving the request from a process of a distributed service at a network traffic component on one of a plurality of sockets of the network traffic component and obtaining span data from the received request. A process associated with the request is identified based on the span data by way of a process identification component in communication with the network traffic component. The plurality of sockets of the network traffic component are monitored by way of a span correlation component to identify a socket connection made by the identified process of the distributed service to send the request. The socket connection is then correlated with the span data to generate span correlation data.

It is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client can be implemented as one or more of the program modules 42. Additionally, the DHCP client may be implemented as separate dedicated processors or a single or several processors to provide the functionality described herein. In embodiments, the DHCP client performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
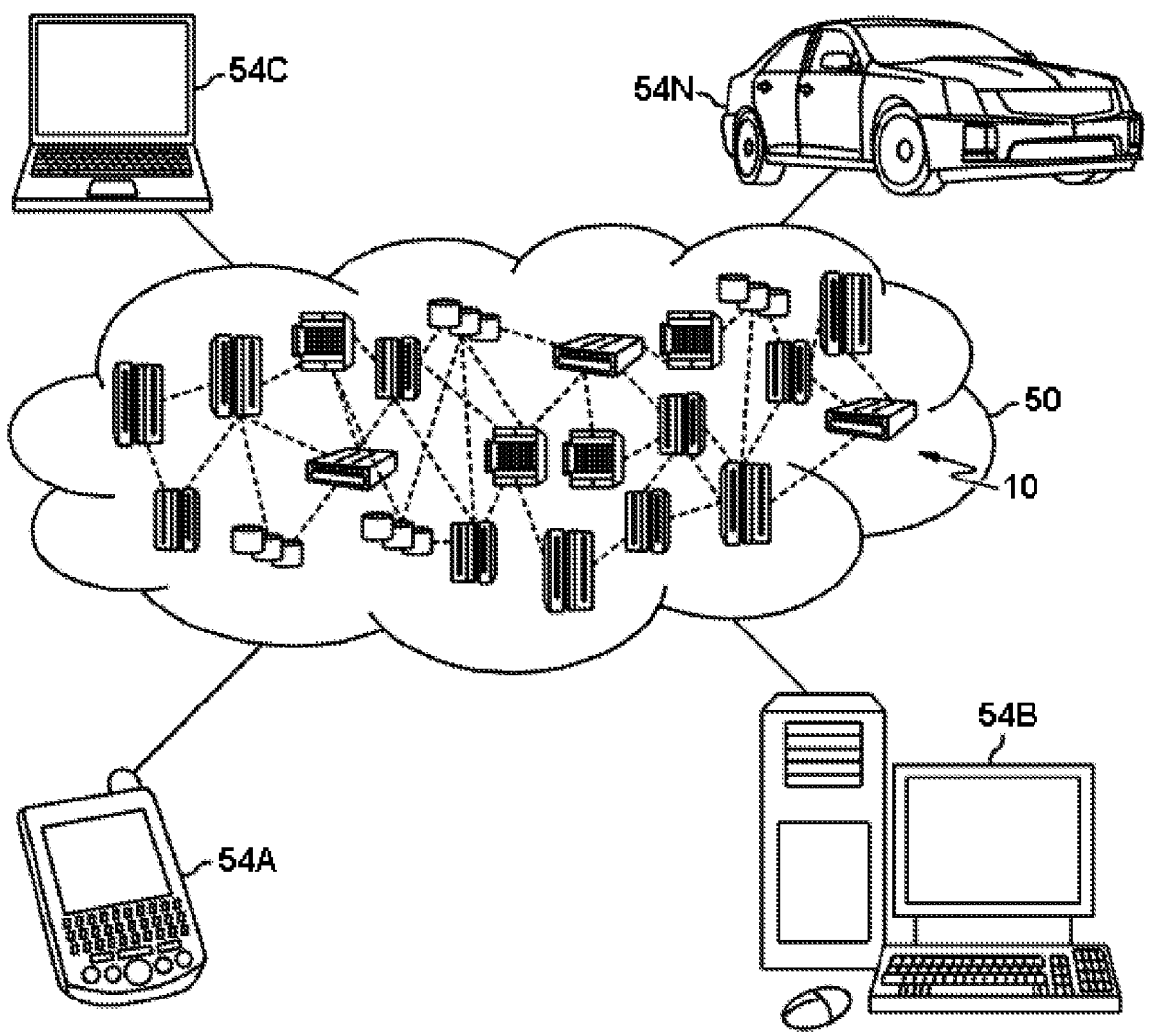
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
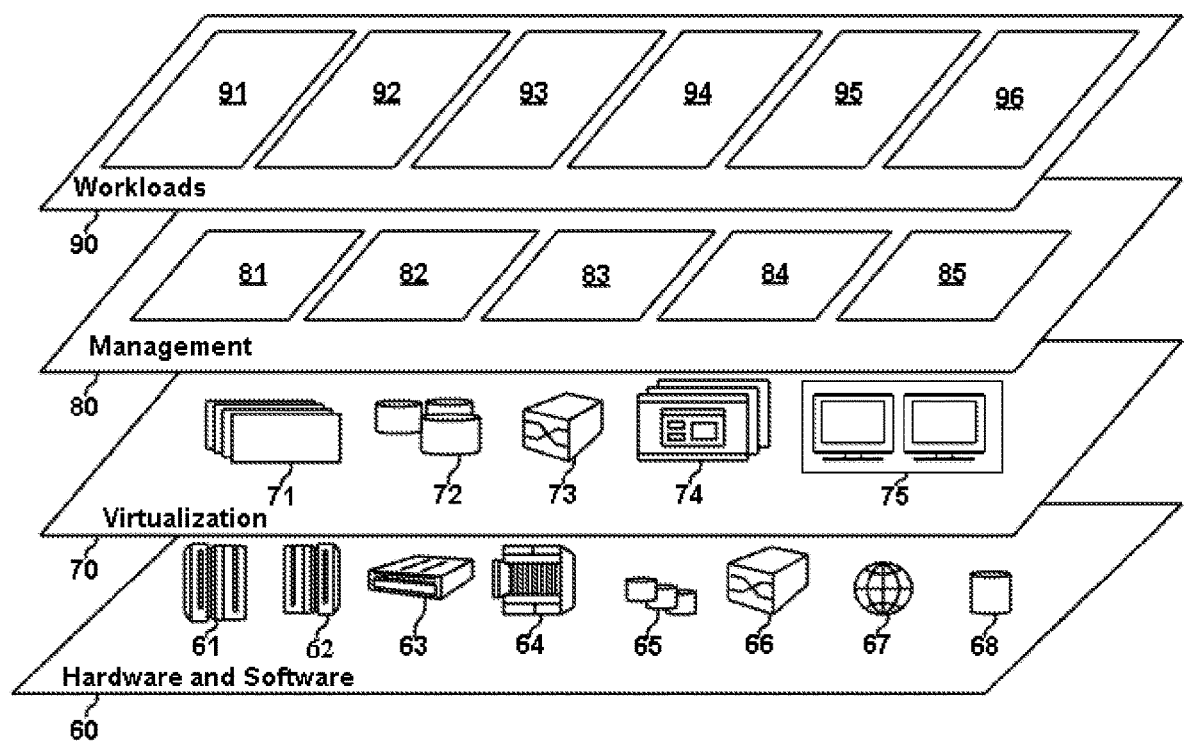
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed request tracing processes 96 described herein. In accordance with aspects of the invention, the distributed request tracing processes 96 workload/function operates to perform one or more of the processes described herein.

Figure 4:
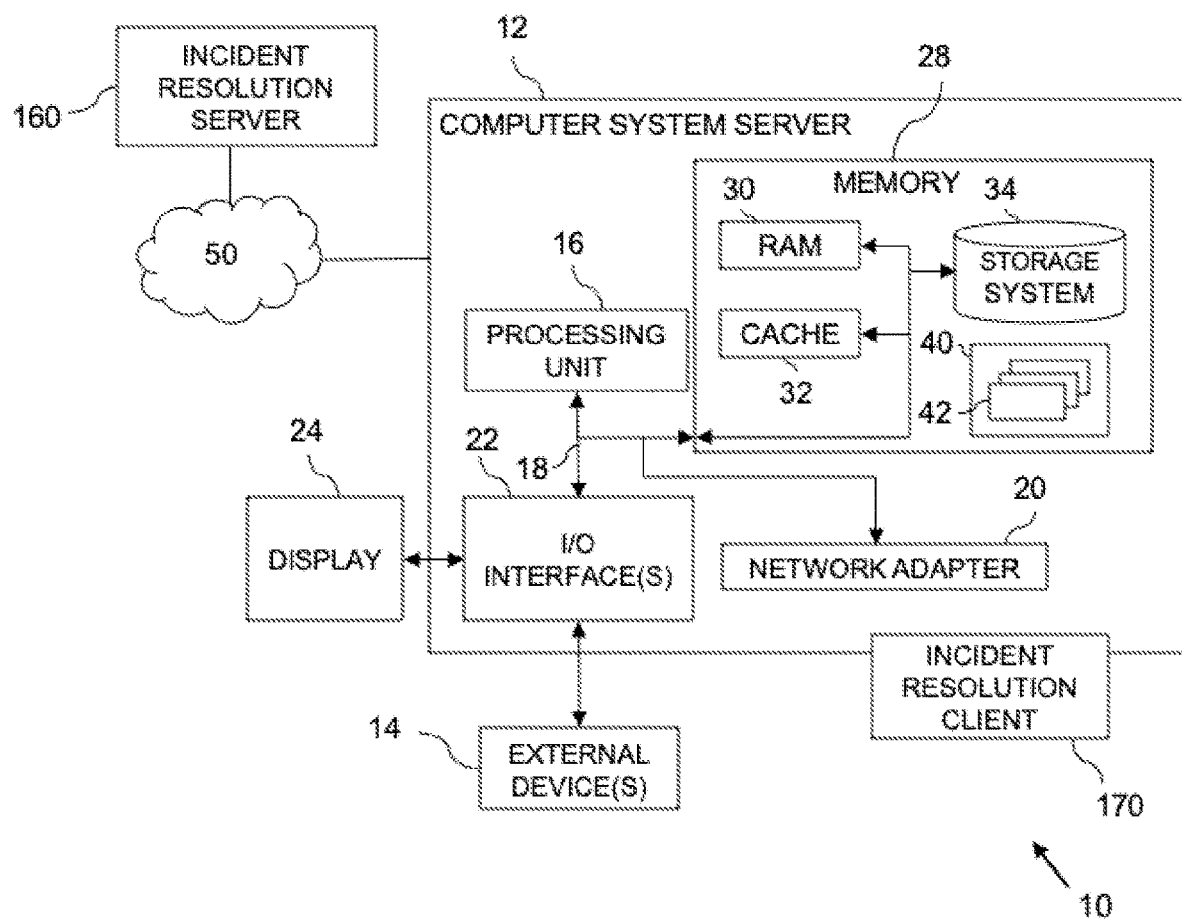
FIG. 4 depicts a cloud computing note according to another embodiment of the present invention.

FIG. 4 depicts a cloud computing node according to another embodiment of the present invention. In particular, FIG. 4 is another cloud computing node which comprises a same cloud computing node 10 as FIG. 1. In FIG. 4, the computer system/server 12 also comprises or communicates with a distributed request tracing client 170, and a distributed request tracing server 160.

In accordance with aspects of the invention, the distributed request tracing client 170 can be implemented as one or more program code in program modules 42 stored in memory 28 as separate or combined modules. Additionally, the distributed request tracing client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the invention.

By way of example, distributed request tracing client 170 may be configured to communicate with the distributed request tracing server 160 via a cloud computing environment 50. As discussed with reference to FIG. 2, for example, cloud computing environment 50 may be the Internet, a local area network, a wide area network, and/or a wireless network. In embodiments of the proposed distributed request tracing mechanism, the distributed request tracing server 160 may provision data to the client 170. One of ordinary skill in the art would understand that the distributed request tracing client 170 and distributed request tracing server 160 may communicate directly. Alternatively, a relay agent may be used as an intermediary to relay messages between distributed request tracing client 170 and distributed request tracing server 160 via the cloud computing environment 50.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Figure 5:
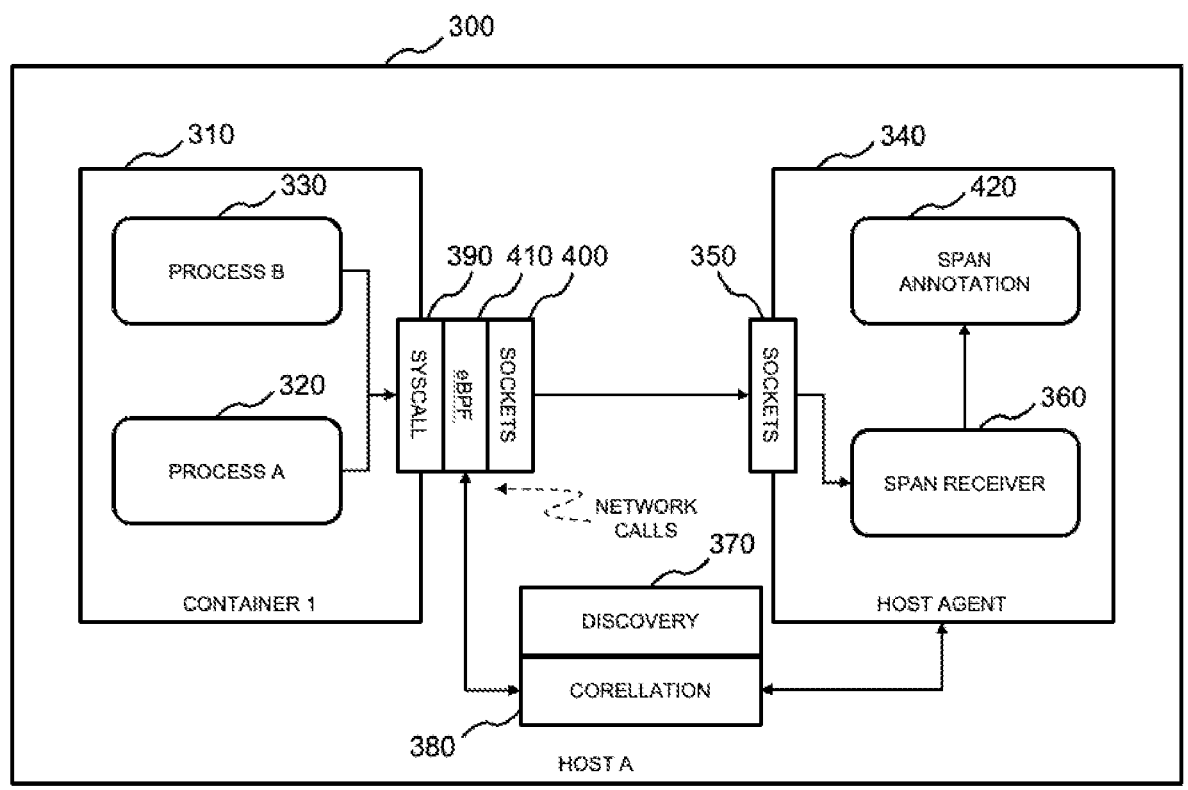
FIG. 5 depicts a system according to an aspect of the invention.

FIG. 5 illustrates an example of a system for tracing a request in a distributed system architecture according to an aspect of the invention. The example embodiment of FIG. 5 may be implemented in the environment of FIGS. 1 and 4, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 5, there is depicted a simplified diagram of a system for tracing a request in a distributed system architecture comprising one or more distributed services. In the example shown in FIG. 5, the system comprises a host application 300, HOST A, adapted to perform request tracing in a distributed system. The host application comprises a container 310 running two processes, PROCESS A 320 and PROCESS B 330. The invention describes a mechanism and system for accurately collecting specific information about processes that are generating and transmitting spans, enabling processes to be correctly identified and correlated to span data.

The system includes a network traffic component in the form of a host agent 340 adapted to receive the request, or span, sent from the process container to a span receiver 360 contained on the host agent by way of one of a plurality of sockets 350. The network traffic component is adapted to obtain span data from the received request in a similar manner to conventional distributed request tracing systems. The span data may comprise one or more of: a process name associated with the process; a start timestamp and a finish timestamp associated with the process; a tag associated with the process; a log associated with the process; a command line associated with the process; and a loaded library associated with the process. It should be noted that although the diagrams show the use of containers, the methods and systems described herein may be implemented in conjunction with individual processes on a host application with no containers in use.

Such a network traffic component 340 may be implemented in a number of conventional request tracing systems and can be applied to physical, virtual, and containerized environments. The network traffic component may be implemented as a host agent or a sidecar proxy agent to the system of the invention.

The host application 300 further comprises a process identification, or process discovery, component 370 in communication with the network traffic component, or host agent, 340. The process identification component is adapted to identify a process of a service associated with the request based on the span data received at the span receiver 360. The process identification component may be further adapted to identify a monitoring requirement of the process and the distributed service associated with the process.

In other words, the system comprises process identification component 370 that uses artefacts of the span data such as process name, command line and loaded libraries to identify processes, the requirements to monitor them, and the services they belong to.

In addition, the system comprises a span correlation component 380 adapted to monitor the plurality of sockets 350 of the network traffic component 340. The span correlation component may monitor the plurality of sockets of the network traffic component by obtaining a snapshot of a current set of socket connections on the plurality of sockets. Alternatively, the span correlation component may monitor the plurality of sockets of the network traffic component by obtaining event based data from the plurality of sockets.

Put another way, there are multiple mechanisms by which the span correlation component 380 may monitor the plurality of sockets 350 of the network traffic component 340. For example, the most simplistic approach to monitoring the plurality of sockets may be to utilize operating system tools to show on request what source and destination sockets and ports are in use, and the processes associated with them.

Alternatively, a more advanced and accurate method of monitoring the plurality of sockets 350 of the network traffic component 340 may utilize extended Berkeley Packet Filter (eBPF) to instrument the network connection APIs to collect event based data for the outbound connections on the sockets made by the monitored processes or services. In a specific example, eBPF may provide a virtual-machine like execution environment in the Linux kernel that allows user-level programs to hook on to static tracing events, dynamic tracing events and profiling events. By attaching kernel probes to the system calls, such as connect( ) close( ) shutdown( ) and the like, the span correlation component 380 may collect process ID, timestamp and connection data.

The span correlation component 380 is further adapted to identify a socket connection made by the identified process of the distributed service to send the request and correlate the socket connection with the span data thereby generating span correlation data. This provides the capabilities to continuously monitor the outbound socket connections made by the processes on the network traffic component in order to identify which specific process is sending span data with greater accuracy.

The span correlation component 380 may be responsible for identifying the source process that generated the received request, and the container the given process is running in if necessary, for span data obtained by the network traffic component 340. The span correlation component may run on the host operating system and maintain a record of the processes that make connections to the sockets 350 of the network traffic component. The span correlation data may include: the process ID; the source socket and port, i.e. details of the socket connections made by the process; and the start and end times of the socket connection.

By way of example, in practice the processes 320, 330 running on the container 310 generate requests, or function calls, which may be passed to a system call component 390 adapted to direct the requests to the host agent 340 for handling. As the requests pass from the system call component to the connection sockets 400 of the container, which connect to the sockets 350 of the host agent, an eBPF component 410 collects information from the processes, for example Process A in Container 1, as they make network calls to send spans to the host agent. The information collected by the eBPF component may be event based data and may be triggered by the connections being initiated on the sockets.

Figure 6:
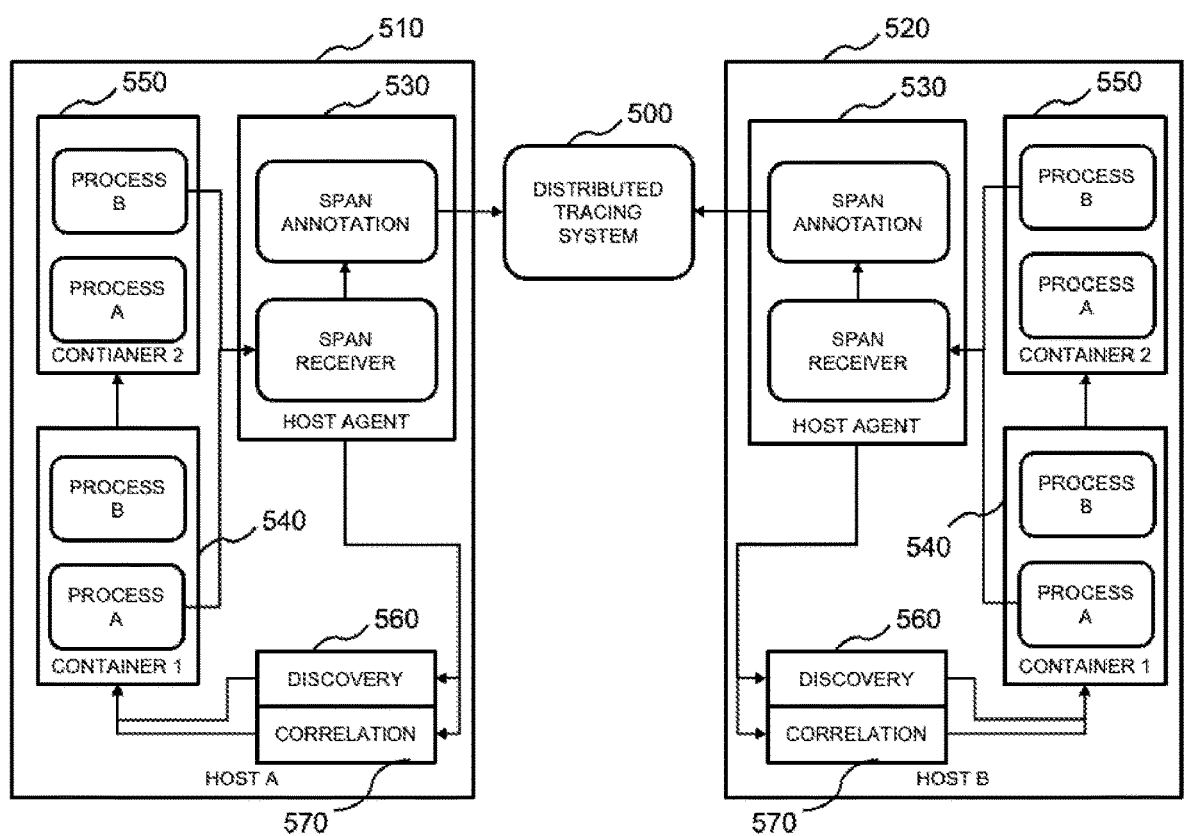
FIG. 6 depicts a distributed tracing system according to an aspect of the invention.

In the example, shown in FIG. 6, the host application comprises a process identification, or process discovery, component 370 adapted to identify a process associated with the request based on the span data received. Further, the system comprises a span correlation component 380 in connection with the eBPF component 410 and the host agent 340, which enables the host agent to lookup which process and container sent the span by correlating the received span data with the information collected by the eBPF component.

In the example shown in FIG. 5, the system further comprises an optional span annotation component 420. However, it should be noted that a system according to an aspect of the invention may or may not include a span annotation component as described herein. Indeed, a system according to the aspect of the invention may comprise a network traffic component, a process identification component and a span correlation component as described above. In the case where the system further comprises a span annotation component, the span correlation data generated by the span correlation component may be used to annotate and augment the span obtained at the network traffic component 340.

Put another way, the system may further comprise a span annotation component 420, which is adapted to annotate the span data with the correlation data and forward the annotated span data to the network traffic component. In addition, the span annotation component may be further adapted to annotate the span data with a process tag based on the identified process as identified by the process identification component 370. In some cases, the process identification component may be further adapted to identify a monitoring requirement of the process, in which case the span annotation component may be further adapted to annotate the span data with the monitoring requirement of the process. In some examples, the process identification component may be further adapted to identify the distributed service associated with the process, and the span annotation component may be further adapted to annotate the span data with the distributed service associated with the process.

The span annotation component 420 may utilize span correlation data from the span correlation component 380, along with data from the network traffic component 250 and the process identification component 370 to annotate and augment the span data obtained by the network traffic component from the services of the distributed system. The annotated span data may then be forwarded, for example, to existing distributed request tracing collection and visualization systems or processes for tracing the request. By providing the annotated span data having the span correlation data annotated thereto, the request associated with the span may be tracked accurately and reliably throughout the distributed system.

The span annotation component 420 may be responsible for taking span data as obtained by the network traffic component and updating it, or annotating it, with accurate process and service information as derived by the span correlation component based on the monitoring of the sockets of the network traffic component. The span annotation component 420 may utilize the following information: the remote socket and port information from the network traffic component 340, which may identify the socket and port used by the process that sent the span data, as monitored by the span correlation component 380; connection and process ID data from the span correlation component, which may identify the process ID of the sender of the span data; and detailed process data, which may include process ID, command line data, loaded libraries and process start time from the process identification component 370.

When new connections are received by the sockets 350 of the network traffic component, information such as the remote source IP and port for the sender may be collected and may be passed to the span annotation component, which may use the span correlation component to map the connection information to the specific process that made the connection and return the process identifier. The span annotation component may then then retrieve the specific process information from the process identification component. This information may then be added, or annotated, to the span data as tags.

The system described above may provide a means for a distributed tracing system to correlate the existing span data with specific host and instance metrics, which may then be utilized to make intelligent and more informed decisions about the behavior of the source of the span data. Further, the systems and methods described herein may provide an automatic means of annotating (tagging) information about the process, such as Process A in Container 1 on Host A, in the span that is reported to the host agent.

For example, by utilizing the span correlation data, or the annotated span data, it may be possible to identify multiple processes sending span data that are part of the same service, even though the original span data may not have been correctly tagged because the processes may have the same characteristics, such as executables, server ports and loaded libraries, including process versions and checksums.

In a further example, by utilizing the span correlation data, or the annotated span data, it may be possible to identify where restarts of processes, or services, have occurred based on a change in process identifier for a process with the same characteristics.

In a further example, by utilizing the span correlation data, or the annotated span data, it may be possible to identify where version changes may have occurred based on a change in process identifier for a process and corresponding minor changes in the process characteristics, such as the same executable name and ports being used but newer versions of the executables and/or loaded libraries are in use.

In a further example, by utilizing the span correlation data, or the annotated span data, it may be possible to identify and differentiate between different services that have a naming collision and have been given the same label by identifying that they have different process characteristics.

Figure 7:
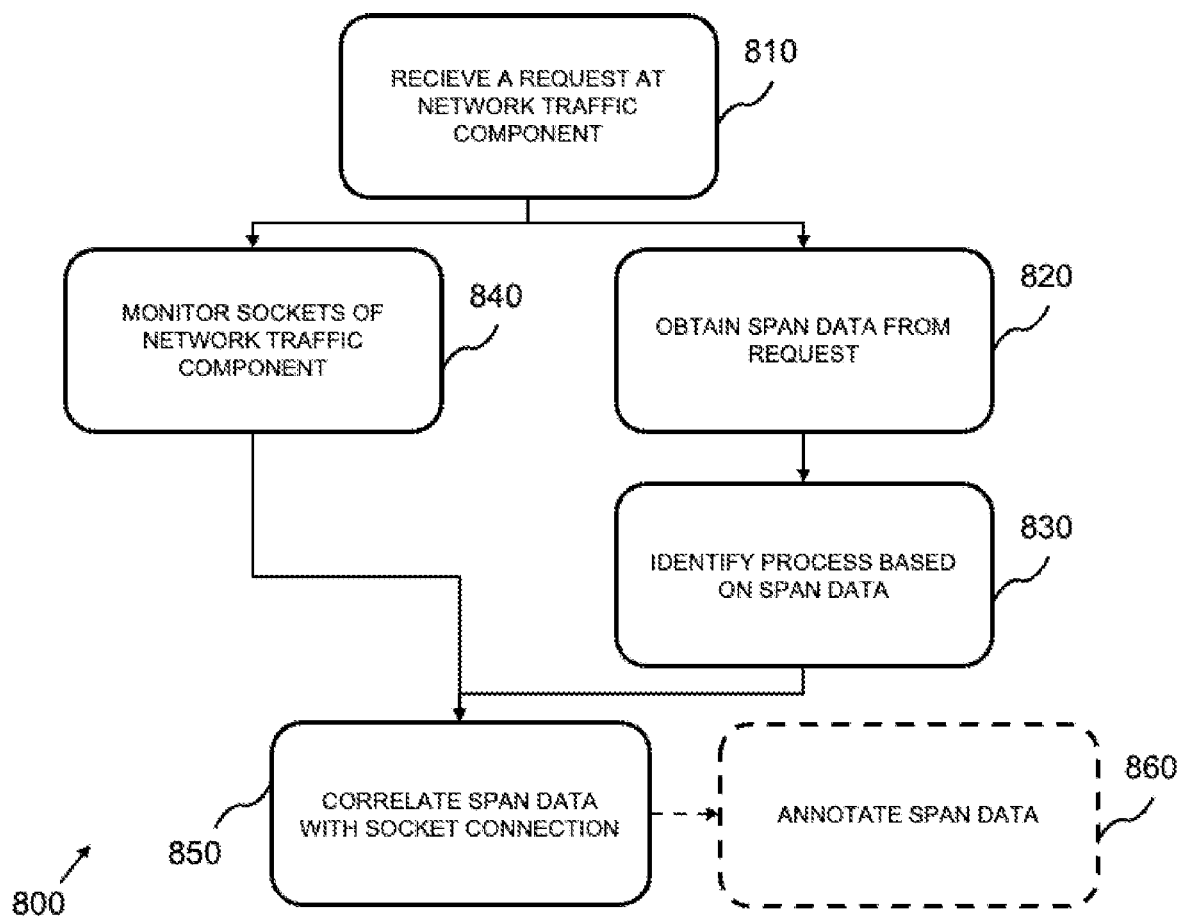
FIG. 7 depicts a method according to an aspect of the invention.

FIG. 7 shows an example of a distributed tracing system 500 according to an aspect of the invention in communication with two host applications, HOST A 510 and HOST B 520, similar to the host application described above with reference to FIG. 6.

In the example, shown in FIG. 7 each host application comprises a host agent 530 in communication a first container 540 that runs two processes, PROCESS A and PROCESS B, and a second container 550 that runs two processes, PROCESS A and PROCESS B. Further, each host application comprises a process identification component 560, or process discovery component, adapted to identify a process associated with a span received by a host agent 520. In addition, each host application comprises a span data correlation component 570 adapted to correlate the identified process with a given socket connection at which a span was received. This correlation data may then be annotated to the span before the span is forwarded through the system.

In the example shown in FIG. 7, there is shown a host agent 530 on each host that receives span from each process. The spans describe the requests those processes are making of other processes, such as requests between Process A in Container 1 on Host A to Process B in Container 2 on Host B. The systems and methods described herein provide an automatic means of annotating (tagging) information about the process, such as Process A in Container 1 on Host A, in the span that is reported to the host agent. This is achieved by having the host agent perform a lookup on the process that sent the span to the host agent by way of the process identification component and the span correlation component.

FIG. 8 shows a method 800 according to an aspect of the invention. In particular, FIG. 8 shows a method for tracing a request in a distributed system architecture comprising one or more distributed services.

The method 800 may begin in step 810 by receiving the request from a process of a distributed service at a network traffic component on one of a plurality of sockets of the network traffic component. In step 820, span data is obtained from the received request and in step 830 a process associated with the request is identified based on the span data, for example by way of a process identification component in communication with the network traffic component as described above.

The sockets of the network traffic component are monitored 840 by way of a span correlation component in order to identify a socket connection made by the identified process of the distributed service to send the request. The monitoring of the sockets of the network traffic component may be a continual process or may be triggered by connection events.

In step 850, the socket connection is correlated with the span data thereby generating span correlation data. The method may then progress to step 860, wherein the span data is annotated with the correlation data.

It should now be understood by those of skill in the art, in embodiments of the present invention, the distributed request tracing concepts provide numerous advantages over conventional distributed tracing approaches. These advantages include, but are not limited to, more accurate tracing of requests through a distributed system. In embodiments of the present invention, this technical solution is accomplished by annotating span data associated with the request.

In still further advantages to a technical problem, the systems and processes described herein provide a computer-implemented method for distributed request tracing may be provided on (or via) on a distributed communication network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for tracing a request in a distributed system architecture comprising a plurality of distributed services, the system comprising,
one or more processors to execute instructions stored in memory to provide;
a network traffic component adapted to receive the request from a process of a first distributed service from the plurality of distributed services on one of a plurality of sockets, wherein the network traffic component is adapted to obtain span data from the received request;
a process identification component in communication with the network traffic component, wherein the process identification component is adapted to identify a process associated with the request based on the span data;
a span correlation component adapted to:
monitor the plurality of sockets of the network traffic component;
identify a socket connection made by the identified process of the first distributed service to send the request;
correlate the socket connection with the span data thereby generating span correlation data, wherein the span correlation data includes a process name associated with the identified process, a source socket and a port for the socket connection, and a start timestamp and a finish timestamp associated with the identified process;
identify different process characteristics for the plurality of distributed services utilizing the span correlation data, wherein a name collision is present in a same label assigned to the first distributed service and a second distributed service from the plurality of services; and
differentiate the first distributed service from the second distributed service based on the span correlation data.

2. The system of claim 1, wherein the process identification component is further adapted to identify one or more of:
a monitoring requirement of the identified process; and
the distributed service associated with the identified process.

3. The system of claim 1, wherein further comprises a span annotation component adapted to:
annotate the span data with the correlation data; and
forward the annotated span data to the network traffic component.

4. The system of claim 3, wherein the span annotation component is further adapted to annotate the span data with a process tag based on the identified process.

5. The system of claim 3, wherein the process identification component is further adapted to identify a monitoring requirement of the identified process, and wherein the span annotation component is further adapted to annotate the span data with the monitoring requirement of the identified process.

6. The system of claim 3, wherein the process identification component is further adapted to identify the distributed service associated with the identified process, and wherein the span annotation component is further adapted to annotate the span data with the distributed service associated with the identified process.

7. The system of claim 1, wherein the network traffic component comprises a sidecar proxy agent.

8. The system of claim 1, wherein the span data comprises:
the process name associated with the identified process;
the start timestamp and the finish timestamp associated with the identified process;
a tag associated with the identified process;
a log associated with the identified process;
a command line associated with the identified process; and
a loaded library associated with the identified process.

9. The system of claim 1, wherein monitoring the plurality of sockets of the network traffic component comprises obtaining a snapshot of a current set of socket connections on the plurality of sockets.

10. The system of claim 1, wherein monitoring the plurality of sockets of the network traffic component comprises obtaining event based data from the plurality of sockets.

11. A computer implemented method for tracing a request in a distributed system architecture comprising a plurality of distributed services, the computer implemented method comprising:
receiving the request from a process of a first distributed service from the plurality of distributed services at a network traffic component on one of a plurality of sockets of the network traffic component;
obtaining span data from the received request;
identifying a process associated with the request based on the span data by way of a process identification component in communication with the network traffic component;
monitoring the plurality of sockets of the network traffic component by way of a span correlation component to identify a socket connection made by the identified process of the first distributed service to send the request;

correlating the socket connection with the span data thereby generating span correlation data, wherein the span correlation data includes a process name associated with the identified process, a source socket and a port for the socket connection, and a start timestamp and a finish timestamp associated with the identified process;

identifying different process characteristics for the plurality of distributed services utilizing the span correlation data, wherein a name collision is present in a same label assigned to the first distributed service and a second distributed service from the plurality of services; and differentiating the first distributed service from the second distributed service based on the span correlation data.

12. The computer implemented method of claim 11, wherein the method computer implemented method further comprising the steps of:

annotating the span data with the correlation data; and forwarding the annotated span data to the network traffic component.

13. The computer implemented method of claim 12, wherein the computer implemented method further comprises the step of annotating the span data with a process tag based on the identified process.

14. The computer implemented method of claim 12, wherein the computer implemented method further comprises the steps of:

identifying a monitoring requirement of the identified process; and annotating the span data with the monitoring requirement of the identified process.

15. The computer implemented method of claim 12, wherein the computer implemented method further comprises the steps of:

identifying the distributed service associated with the identified process;

annotating the span data with the distributed service associated with the identified process.

16. The computer implemented method of claim 11, wherein the span data comprises:

the process name associated with the identified process;

the start timestamp and the finish timestamp associated with the identified process;

a tag associated with the identified process;

a log associated with the identified process;

a command line associated with the identified process; and a loaded library associated with the identified process.

17. The computer implemented method of claim 11, wherein monitoring the plurality of sockets of the network traffic component comprises one or more of:

obtaining a snapshot of a current set of socket connections on the plurality of sockets; and obtaining event based data from the plurality of sockets.

18. A computer program product for tracing a request in a distributed system architecture comprising a plurality of distributed services, the computer program product comprising a non-transitory computer readable storage medium having program instructions embodied therewith, the program instructions executable by a processor to cause the processor to perform a method comprising:

receiving the request from a process of a first distributed service from the plurality of distributed services at a network traffic component on one of a plurality of sockets of the network traffic component;

obtaining span data from the received request;

identifying a process associated with the request based on the span data by way of a process identification component in communication with the network traffic component;

monitoring the plurality of sockets of the network traffic component by way of a span correlation component to identify a socket connection made by the identified process of the first distributed service to send the request;

correlating the socket connection with the span data thereby generating span correlation data, wherein the span correlation data includes a process name associated with the identified process, a source socket and a port for the socket connection, and a start timestamp and a finish timestamp associated with the identified process;

identifying different process characteristics for the plurality of distributed services utilizing the span correlation data, wherein a name collision is present in a same label assigned to the first distributed service and a second distributed service from the plurality of services; and differentiating the first distributed service from the second distributed service based on the span correlation data.

19. The computer program product of claim 18, the computer program product comprising the non-transitory computer readable storage medium having program instructions embodied therewith, the program instructions executable by a processing unit to cause the processing unit to perform the further steps of:

annotating the span data with the correlation data; and forwarding the annotated span data to the network traffic component.

20. The computer program product of claim 19, the computer program product comprising the non-transitory computer readable storage medium having program instructions embodied therewith, the program instructions executable by a processing unit to cause the processing unit to perform the further steps of:

identifying a monitoring requirement of the identified process; and annotating the span data with the monitoring requirement of the identified process.

* * * * *